(No Model.)

G. LAUT.
BRIDGE GATE.

No. 515,834. Patented Mar. 6, 1894.

Witnesses:
Rudolph W. Lotz
T. A. Moore

Inventor
George Laut
By Lotz & Kennedy
his attorneys

UNITED STATES PATENT OFFICE.

GEORGE LAUT, OF CHICAGO, ILLINOIS.

BRIDGE-GATE.

SPECIFICATION forming part of Letters Patent No. 515,834, dated March 6, 1894.

Application filed February 28, 1893. Serial No. 464,130. (No model.)

*To all whom it may concern:*

Be it known that I, GEORGE LAUT, a citizen of the United States, residing at Chicago, in the county of Cook and State of Illinois, have invented certain new and useful Improvements in Bridge-Gates; and I do hereby declare the following to be a full, clear, and exact description of the invention, such as will enable others skilled in the art to which it appertains to make and use the same.

This invention relates to a novel construction in bridge gates, the object being to provide a bridge gate that will be closed when the bridge swings open and it will be opened when the bridge swings to.

The invention consists in the features of construction and combinations of parts hereinafter fully described and specifically claimed.

Figure 1:
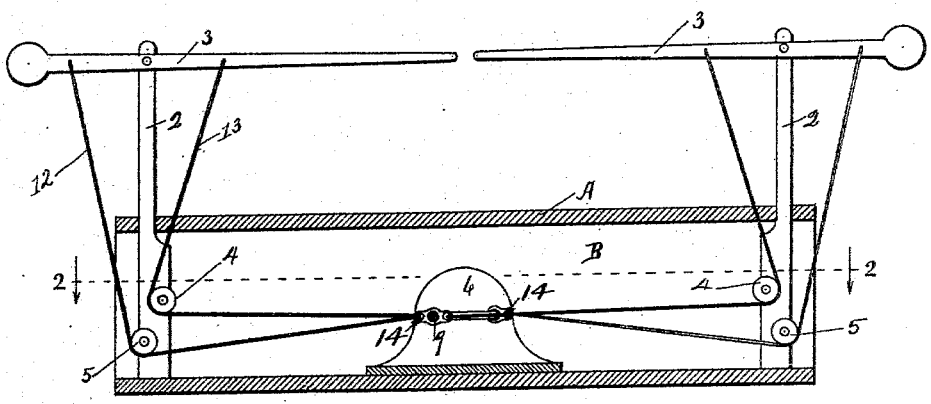
Figure 5:
Figure 2:
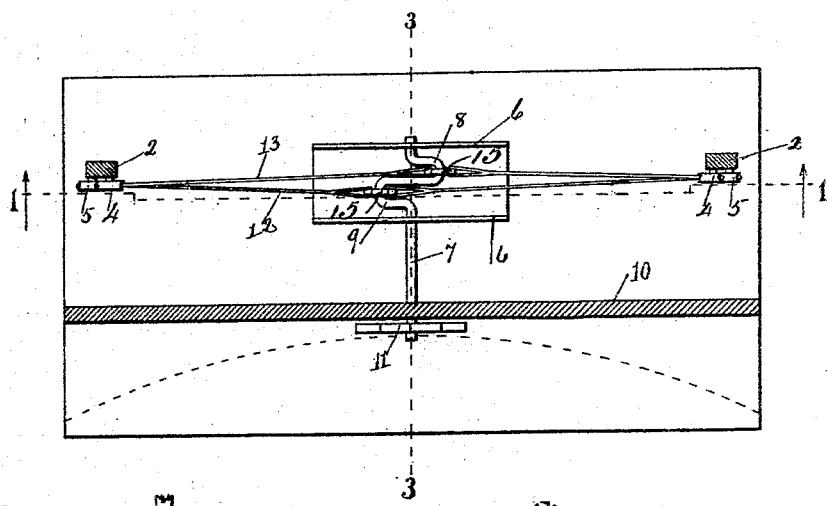
Figure 3:
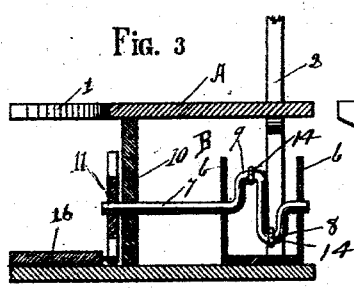
Figure 4:
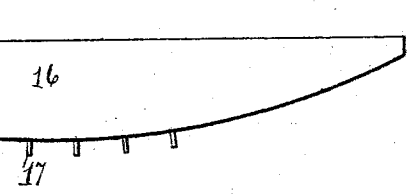

In the accompanying drawings illustrating my invention,—Figure 1 is a vertical cross section of the bridge approach provided with a gate constructed in accordance with my invention and taken on the line 1—1 of Fig. 2. Fig. 2 is a horizontal section on the line 2—2 of Fig. 1. Fig. 3 is a vertical section on the line 3—3 of Fig. 2. Figs. 4 and 5 are fragmentary views.

Referring now to said drawings, A indicates the roadway or bridge approach having the curved end 1 to permit the swinging of the end of the bridge. Beneath the bridge approach A is made a vault or pit B and at the sides of the approach are arranged two posts 2 upon the upper end of which are pivoted the gate arms 3. The posts 2 extend downwardly into the pit B and each is provided with two pulleys 4 and 5. About midway between the sides of the approach and located within said pit are uprising plates 6 that serve to support a revoluble shaft 7 that is provided within said plates 6 with double cranks 8 and 9. One end of the said shaft 7 extends outwardly and passes the bridge approach in the front piece 10 of the pit and is provided outside said front piece with a star wheel 11 that serves as the gearing between the bridge and the gate arms. The connection between cranks 8 and 9 and the gate arms is made by cords or cables connected at their opposite ends with the cranks and the gate arms and trained around the pulleys 4 and 5. Each gate arm is provided with two cables 12 and 13 which are connected with the gate arm on opposite sides of its pivot, as shown in Fig. 1. When the gate arms are down the cranks stand in a horizontal position; and the cable 12 that is connected with the gate arm in the rear of its pivot is carried downwardly and trained around the lower pulley 5 and then connected with the crank 9, which crank stands nearest to the gate arm. The other cable 13 that is connected with the gate arm on the other side of the pivot is carried down and trained around the pulley 4 and then is connected with the other crank 8. The said cables are connected with the cranks by means of the double eyes 14 that are connected with the collar 15 that receives the crank arm. This construction is shown in detail in Fig. 5. It will be noted, of course, that the gate arms on both sides of the bridge are connected with the cranks in this manner.

In Figs. 3 and 4 I have shown a curved projection 16 that is to be secured to the ends of the bridge in any suitable manner at about the level of the lower portion of the star wheel 11, said curved projection 16 is provided on its outer edge with a series of pins or teeth 17 adapted to engage said star wheel. The number of teeth upon said projection is such that the star wheel will be given one turn by contact with all of said teeth 17, and when the bridge is closed said teeth engage said star wheel.

In Figs. 1 and 2 I have shown the parts in the position they will assume when the bridge is swung and the gates are closed, and in Fig. 3 the position the parts will assume when the bridge is partially opened and the gates half closed. When the bridge first commences to swing the shaft 7 will be turned by reason of the engagement of the star wheel with the teeth 17 of the projection 16 on the bridge, and this will turn the crank arms and said crank arms in turning will pull on one set of cables and pay out the other, as will be plainly obvious, which will have the effect of elevating the gate arms. The said crank arms will be given a half revolution when the bridge swings open, and in swinging to the shaft will be given another half revolution which will have the effect of opening the gates again.

I claim as my invention—

The combination with a swinging bridge having a curved projection provided with a series of teeth, of a shaft 7 mounted upon the abutments or bridge approach and having a gear wheel 11 located in the path of the teeth of said projection of the bridge, and provided with double crank arms, pivoted gate arms mounted upon posts, and cables 12 and 13 connected with said gate arms on opposite sides of their pivot and with the said cranks of the shaft, substantially as described.

In testimony whereof I affix my signature in presence of two witnesses.

GEORGE LAUT.

Witnesses:
WM. H. LOTZ,
HARRY COBB KENNEDY.